April 24, 1951 T. M. FERRILL, JR 2,549,789

TANK CIRCUIT APPARATUS

Filed Dec. 31, 1947 5 Sheets-Sheet 1

INVENTOR

THOMAS M. FERRILL, JR.

Thomas M. Ferrill Jr.

ALL CAM FOLLOWER REPRESENTATIONS ARE POSITIONED TO INDICATE THE RELATIVE ANGULAR RELATIONS WHEN SHAFT 14 IS POSITIONED FOR MAXIMUM CAPACITANCE

INVENTOR
THOMAS M. FERRILL, JR.
Thomas M. Ferrill, Jr.

April 24, 1951 T. M. FERRILL, JR 2,549,789

TANK CIRCUIT APPARATUS

Filed Dec. 31, 1947 5 Sheets-Sheet 3

INVENTOR
THOMAS M. FERRILL, JR.
Thomas M. Ferrill, Jr.

April 24, 1951 T. M. FERRILL, JR 2,549,789

TANK CIRCUIT APPARATUS

Filed Dec. 31, 1947 5 Sheets-Sheet 4

INVENTOR

THOMAS M. FERRILL, JR.

Thomas M. Ferrill, Jr.

TANK CIRCUIT APPARATUS

Filed Dec. 31, 1947

INVENTOR

THOMAS M. FERRILL, JR.

Thomas M. Ferrill, Jr.

UNITED STATES PATENT OFFICE 2,549,789

TANK CIRCUIT APPARATUS

Thomas M. Ferrill, Jr., Hempstead, N. Y.

Application December 31, 1947, Serial No. 795,022

25 Claims. (Cl. 250—40)

The present invention relates to tuned circuits, and is particularly concerned with tuned circuits or tank circuits of great flexibility and compactness and capable of being tuned through a plurality of frequency bands.

For operation of radio equipment within a narrow frequency range, e. g. a range narrower than an octave, a simple inductor and a variable capacitor usually are provided, fixedly interconnected. The ratio of inductance and capacitance is selected for a mid-band frequency according to load conditions and desired operating Q.

Where radio equipment is to be operated at various frequencies thruugh a frequency range of a plurality of octaves, this arrangement becomes inadequate in several respects. Since the resonant frequency of a tank circuit varies in inverse proportion to the square root of the product of the capacitance and inductance of the reactance elements, the tuning range with fixed inductance is greatly restricted by the practical limitations upon the ratio of maximum capacitance to minimum capacitance of reasonably compact variable capacitors, particularly in capacitors having plates widely spaced for withstanding high voltage.

Where radio equipment is to be operated at various frequencies throughout a very wide range of frequencies it has been common practice to provide a plurality of interchangeable coils of markedly different inductance values, so that a shift from one band to a frequency in a different band may be accomplished by substitution of a different coil in the tank circuit, followed by such additional adjustment as is required in the variable capacitor.

While the use of interchangeable coils with a fixedly connected variable capacitor makes it possible to adjust the tank circuit to resonance at any desired frequency in a very wide range, e. g. in a range of several octaves, it is inconvenient to provide several unattached coils; and the process of coil substitution, even if plugs and sockets are employed, makes great changes of frequency cumbersome and inconvenient. This is especially objectionable where the radio equipment includes several amplifier stages, with many tank circuits to be returned, e. g. grid circuits and plate circuits of several stages, antenna tuning circuits, and wave-meter or monitor circuits.

Not only are interchangeable coil arrangements inconvenient, but also they usually fall far short of maintaining an optimum inductance-capacitance ratio for a given set of operating conditions, e. g., for given anode voltage and current conditions in a radio-frequency amplifier according to its rated operating conditions. For a frequency change of three octaves, e. g. a change from 3.5 megacycles to 28 megacycles, the inductance and the capacitance ideally should each be reduced by a factor of 8. In practice, however, the variable capacitor does not admit of a reduction of the circuit capacitance beyond one-fourth the 3.5-mc. value, so that the inductance must be reduced by an excessive factor, e. g. to one-sixteenth the value employed at 3.5 mc., the ratio of inductance and capacitance having thus changed by a factor of at least four. In some instances, a change of the inductance-capacitance ratio by a factor as great as 16 has been required in plug-in tank circuits by the tank capacitor limitations.

It is an important object of the present invention to provide an improved tank circuit apparatus, and particularly, to provide unitary, self-contained tank circuit apparatus capable of efficient operation at a variety of frequencies through a wide frequency range with convenient and simple adjustments.

It is a further object to provide tank circuit apparatus capable of wide-range operation without excessive change of inductance-capacitance ratio.

Another object is to provide a tank circuit capable of being tuned through a plurality of bands in a wide frequency range, with great simplicity of operation, and with the maintenance of high circuit efficiency and optimum inductance-capacitance relations.

Yet a further object of this invention is to provide multi-range tank circuit apparatus free from any ambiguity of tuning range.

Still another object is to incorporate in the multi-range tank circuit apparatus an adjustable coupling system capable of full-range, simple adjustment of the coupling of the tank apparatus to an external circuit at all frequencies of operation.

According to an important feature of the present invention, a tank circuit is made with a smoothly variable reactance element connected to step-variable reactance means of the opposite reactance sign, and an arrangement is provided for varying the opposite-sign reactance in predetermined steps at selected points in the adjustment of the smoothly variable reactance element. The smoothly variable reactance element preferably is a variable capacitor having an array of evenly spaced and substantially semi-circular rotor plates arranged for variable mesh with alternate stator plates; and the step-variable reactance means preferably comprises a plurality of coils or coil portions among which selection is made by switch elements coupled to the capacitor rotor, inductance changes also being further available through short-circuiting or open-circuiting of turns in one coil or in a plurality of coils by capacitor rotor-operated switch elements. Where a plurality of coils are provided and made selectable according to capacitor rotor position, a single link winding for external circuit coupling may be pivoted or otherwise made movable through such a range of position as to provide wide-range variation of coupling between the coil and the external circuit.

The present invention will now be described more fully in relation to the accompanying drawings, wherein.

Figure 1:
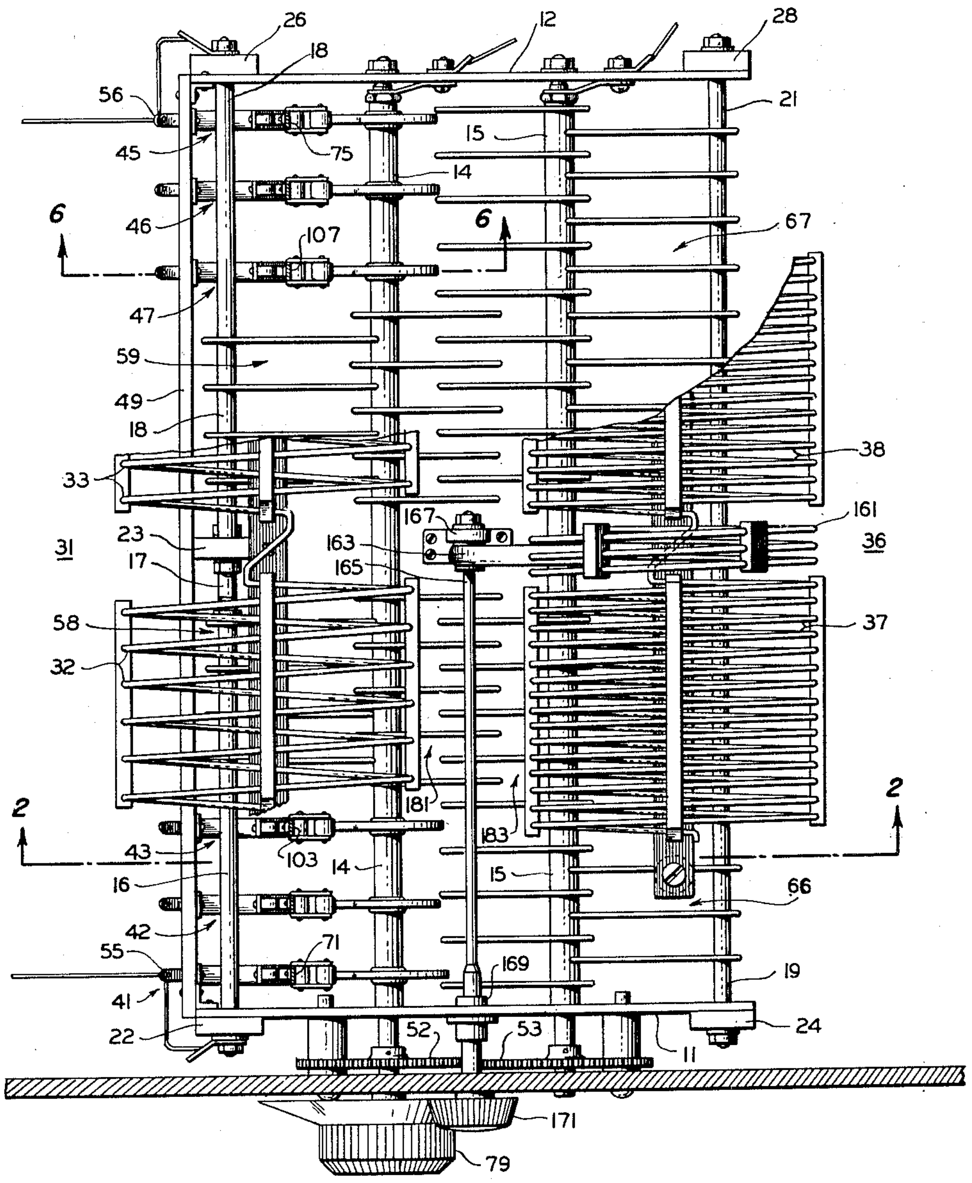
Fig. 1 is a plan view of a balanced or symmetrical tank circuit arrangement constructed according to the invention, parts being broken away or omitted to show details thereof.
Figure 2:
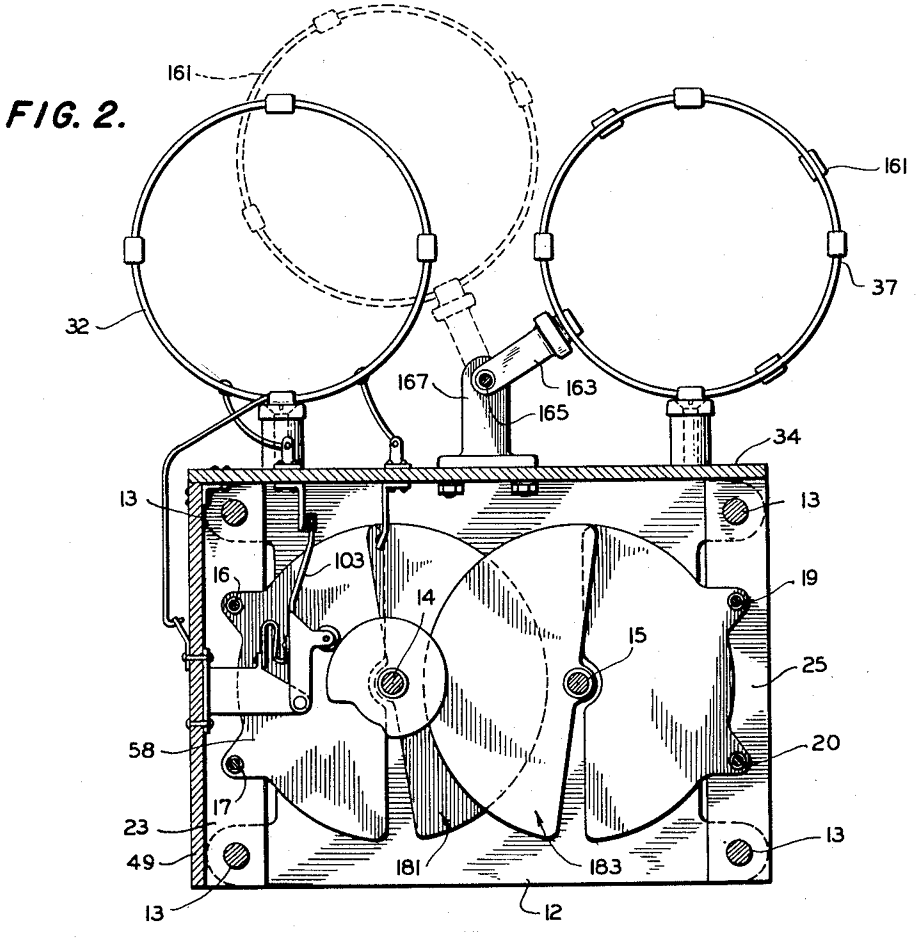
Fig. 2 is a cross-sectional view taken in the plane indicated by the line 2—2 in Fig. 1.

Referring now to Figs. 1 and 2, the capacitance sections of a balanced version of the tank circuit are arranged within a frame comprising front and rear metal end plates 11 and 12 and tie rods 13 (Fig. 2) fastened therebetween to form a rigid assembly. The rotor plates are arranged in four groups on two parallel rotor shafts 14 and 15, each journalled in bearings in the end plates 11 and 12. Cooperating groups of stator plates are arranged on rods 16, 17, 18, 19, 20 and 21, and two further rods hidden from view in Fig. 1 beneath rods 18 and 21. Rods 16 and 17 are suspended between a vertical dielectric bar 22 on the front end plate 11 and a vertical dielectric bar 23 supported by the tie rods midway between end plates, and rods 19 and 20 are suspended between a vertical dielectric bar 24 on front end plate 11 and a second mid-way bar 25 (Fig. 2). Rods 18 and 21 and similar lower rods directly thereunder are supported between bar 23 and a bar 26 on the rear end plate 12 and between bar 25 and a bar 28 on the rear end plate.

A first inductor 31 having a front coil half 32 and a rear coil half 33 is supported on stand-off insulators or dielectric pillars fastened to a dielectric plate 34 which is attached to the tops of the end plates 11 and 12. A second inductor 36 having a front coil half 37 and a rear coil half 38, and having appreciably greater inductance than inductor 31, e. g. four times the inductance of inductor 31, is similarly supported above plate 34, above the stator sections associated with rotor 15.

The tie rods 13 and plate 34 are omitted from Fig. 1, and (portions of the coils are broken away) this view being made largely schematic for making the positions of the parts clearly apparent.

Three cam switches 41, 42 and 43 are provided within the front end of the variable capacitor framework, and a similar group of three switches 45, 46 and 47 are provided within the rear end. Each of these six switches comprises a dielectric disc cam on shaft 14 and a cooperating rocker-arm element hinged from a stanchion on a vertical dielectric side plate 49, this side plate being attached to the frame in a manner generally similar to the manner of attachment of top plate 34. A suitable dielectric material for the top and side plates 34 and 49, the switch cams and the inductor mounting pillars is Dilectene, a rigid low-loss phenolic material produced by the Continental-Diamond Fibre Company.

Figure 3:
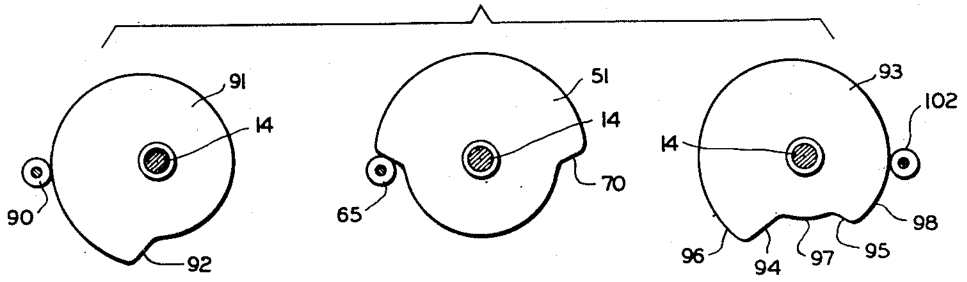
Fig. 3 is a group of cam development views of the cams employed for changing the inductance in the arrangement of Figs. 1 and 2 at selected points in the tuning thereof.
Figure 4:
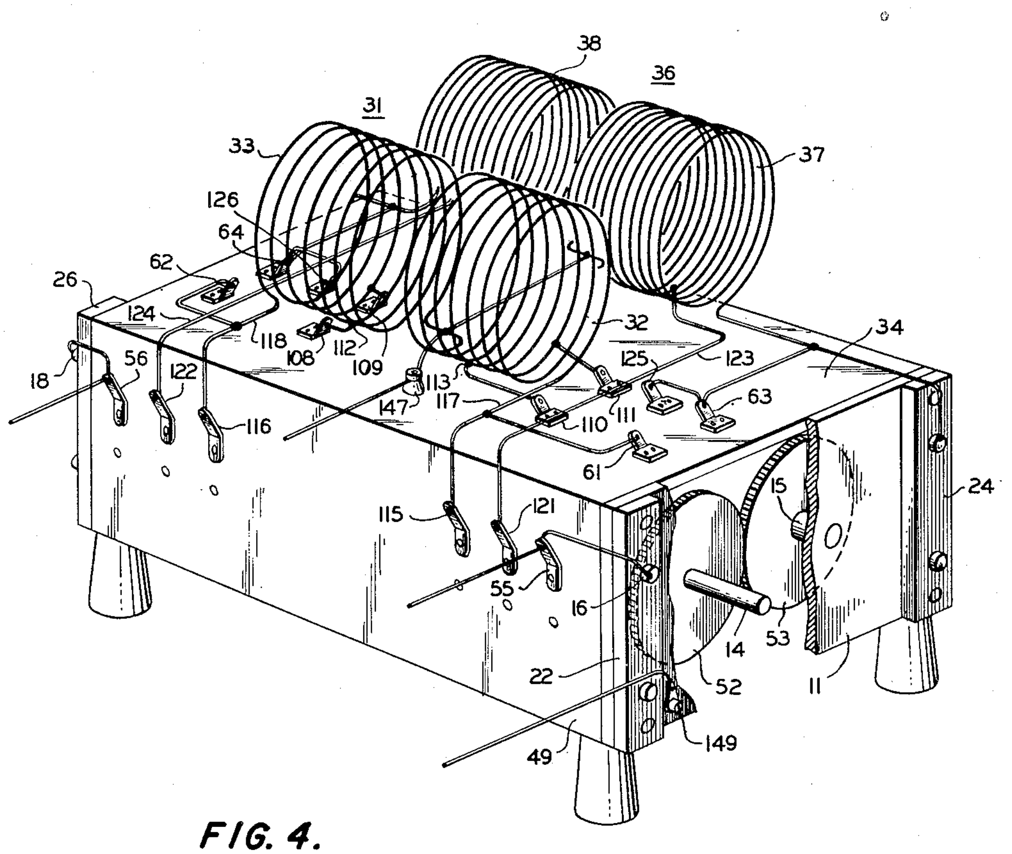
Fig. 4 is a schematic view of the balanced tank arrangement illustrating the wiring of the switches to the coils and capacitors.

The rotor shafts 14 and 15 are intercoupled through 1:1 ratio gears 52 and 53, arranged externally as in Fig. 1 or internally as in Fig. 4, for rotation in such a way that all capacitance sections reach minimum capacitance together and similarly reach maximum capacitance together. The outermost switches 41 and 45 are double-throw switches arranged with cams in the form illustrated at 51 in Fig. 3, so positioned relative to the rotor plates and the switch stanchions and contact elements as to provide a throw as the rotors are turned through the maximum-capacitance positions and to provide a further throw as the rotors are turned through the minimum-capacitance positions.

Figure 8:
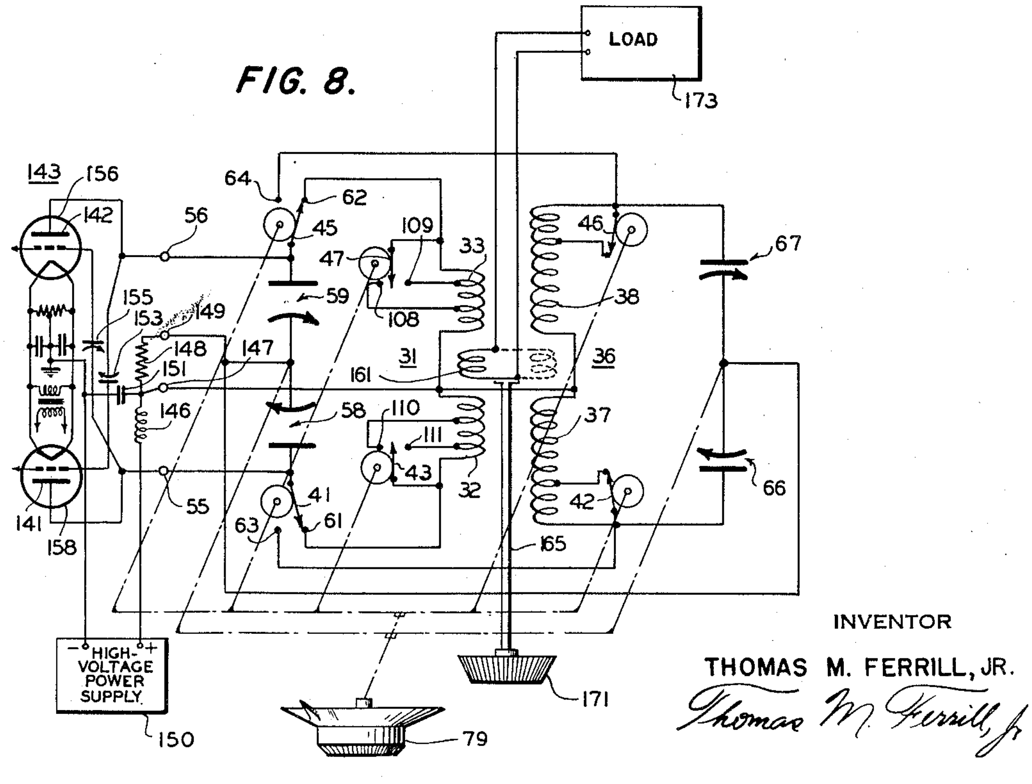
Fig. 8 is a schematic circuit diagram of the balanced tank, showing it as applied to the anode circuit of a radio-frequency amplifier.

Terminal lugs 55 and 56 connected to the stanchions of switches 41 and 45 are provided for external connection to the circuit elements with which the tank unit is to be operated, as for example for connection to the anodes of radio-frequency amplifier tubes connected for push-pull operation, in a manner to be described hereafter in connection with Fig. 8. These lugs 55 and 56 are connected as shown in Fig. 4 to the stator terminals at the ends of rods 16 and 18, so that the symmetrical stators of the smaller variable capacitor sections 58 and 59 are permanently connected in the tuned circuit. As illustrated in Fig. 4, the left-hand fixed terminal 61 of switch 41 is connected to the front end of inductor 31, and the corresponding terminal 62 of switch 45 is connected to the rear end of inductor 31. The right-hand fixed terminals 63 and 64 of these switches are connected to the ends of inductor 36, to which are also fixedly connected the stator terminals of the larger capacitor sections 66 and 67.

Capacitor sections 58 and 59 together are the equivalent of a "split-stator" or balanced capacitor, which may be of 40 micro-microfarads maximum capacitance per section. Similarly, sections 66 and 67 together are the equivalent of a split-stator capacitor which may be of 120 micro-microfarads maximum capacitance per section, for example. As will subsequently appear, the smaller split-stator capacitor 58, 59 is used alone for high frequencies, and is added to the capacitance of capacitor 66, 67 for low frequencies.

The cam diagram 51 in Fig. 3 diagrammatically shows the relative positioning of the cam and the cam follower wheel 65 of switch 41 (and similarly switch 45) when the capacitor rotors are angularly positioned for full mesh of the respective capacitor stator and rotor plates—i. e., for maximum capacitance in each of the capacitor sections. As is apparent in this diagram, the follower 65 is allowed to come inward toward shaft 14 just at the commencement of clockwise rotation of the tuning shaft 14 from the maximum capacitance setting, so that the follower rocker arms 71 and 75 of switches 41 and 45 come into contact with terminals 63 and 64 of these switches. These connections are maintained substantially throughout the clockwise 180° maximum-to-minimum capacitance range of the tuning shaft 14, and as the end of this tuning range is reached, the follower 65 is moved outward by shoulder 70, representing the transfer of the switch arms 71 and 75 to contact terminals 61 and 62 and to maintain connection therewith substantially throughout the clockwise 180° minimum-to-maximum capacitance range of the tuning shaft 14 (the half of the revolution which may otherwise be expressed as the counterclockwise 180° maximum-to-minimum capacitance part of the dial range).

Figure 5:
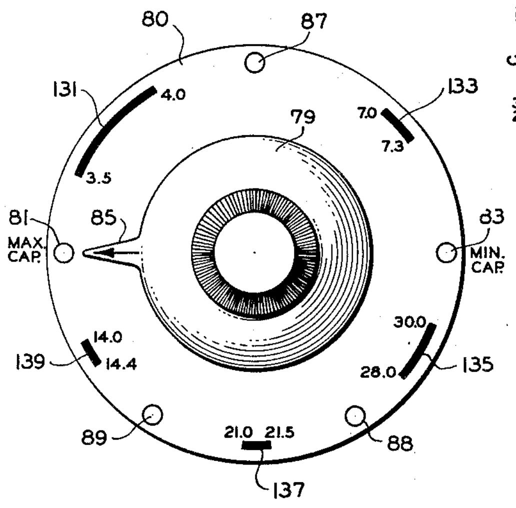
Fig. 5 is a view of a calibration dial plate for the tank arrangement of Figs. 1, 2 and 4, showing the points of switching inductance and a representative group of frequency bands through which the tank may be made to tune.

The general plan of the tuning ranges of the tank circuit of Figs. 1–4 is visualizable by reference to Fig. 5, which shows a calibrated dial plate 80 to be affixed to the front panel of the radio equipment in which the tank unit is employed, and a pointer knob 79 for attachment to the forwardly-extending shaft 14. The maximum capacitance point is indicated at 81, and the minimum capacitance point is indicated at 83, these being the respective locations of pointer 85 corresponding to the points of simultaneous shiftings of the switch follower arms 71 and 75. During the rotation of the pointer through the upper semi-circular part of its range between these points, arms 71 and 75 rest in contact with stator elements 63 and 64, respectively, and accordingly all capacitor sections are employed in connection with inductor 36, inductor 31 being then excluded from the circuit. Under these conditions, the tank circuit provides for tuning to relatively low frequencies, all rotor and stator plates being employed.

During the rotation of the pointer through the lower semi-circular part of its range between points 81 and 83, arms 71 and 75 are held in contact with contact elements 61 and 62, so that the effective tank circuit then comprises merely capacitor sections 58 and 59 in connection with inductor 31. Inductor 36 and capacitor sections 66 and 67 are excluded from the active circuit under these conditions, and the tank circuit provides for tuning to relatively high frequencies.

Figure 6:
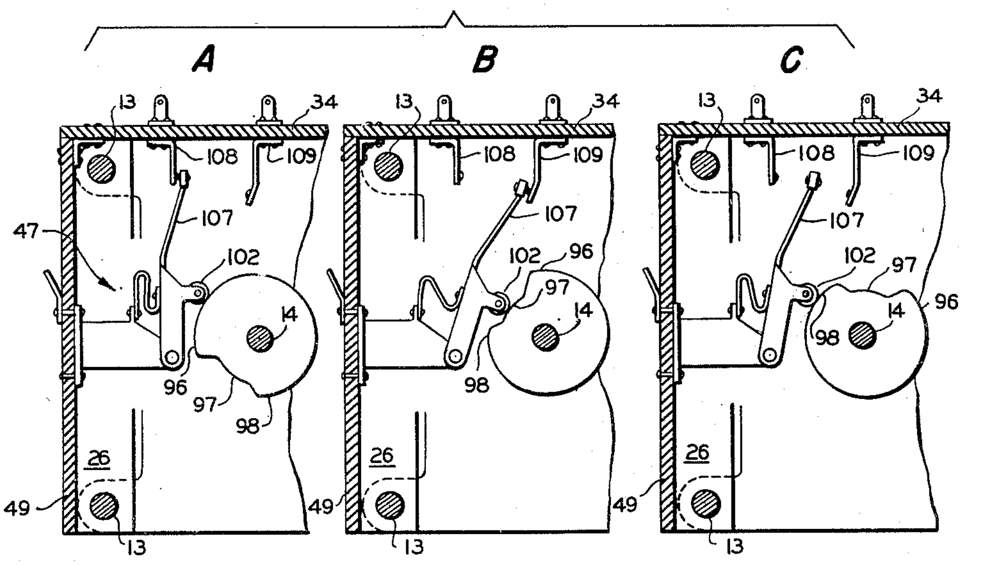
Fig. 6 shows, in views A, B, and C, successive conditions provided in one of the cam-operated switches of Fig. 1.

Cam switches 42 and 46 provide for abrupt inductance changes in the low-frequency inductor 36 at a selected point 87, and switches 43 and 47 provide for abrupt inductance changes in the high-frequency inductor 31 at selected points 88 and 89. The cam form for single-throw switches 42 and 46 is shown at 91 in Fig. 3, while the form for the cams for switches 43 and 47 is illustrated at 93. The former cam has just one significant shoulder at 92, at such angular disposition that the cam follower 90 is shifted when the pointer 85 reaches point 87, Fig. 5. The latter cam form 93 is the most complex of all employed in this tank system, having two shoulders 94 and 95 and three significant arcuate portions 96, 97 and 98 of different radii. These three different radii are provided for three positions of the rocker follower arms 103 and 107 of switches 43 and 47, as illustrated in Fig. 6. At A, the roller 102 of the rocker arm 107 of switch 47 is displaced outward to maximum radius from shaft 14, so that contact is established between arm 107 and the left-hand fixed contact element 108. This condition is maintained throughout nearly 60° of the rotation of pointer 85 clockwise beyond point 83 (Fig. 5), as the capacitance of the then effective lower capacitance split-stator capacitor 58, 59 increases from minimum. Next, the follower drops inward to the minimum-radius arcuate portion 97, with arm 107 resting in contact with contact element 109 through the next near-60° portion of the tuning range, this condition being represented in Fig. 6–B.

The zone in the rotation of knob 79 at which switch arm 107 is transferred from contact element 108 to element 109 is represented at 88 in Fig. 5, and the zone of transfer of arm 107 to a position midway between contact elements 108 and 109 (follower roller 102 then riding on the arcuate sector 98 of the cam as shown in Fig. 6–C) is indicated at 89 in Fig. 5.

Fig. 4 is a schematic view of the electrical connections of the inductors and capacitors. The stanchions of switches 43 and 47 are connected through lugs 115 and 116 and conductors 117 and 118 to the ends of inductor 31. Contact elements 108 and 110 are connected to inner points 112 and 113 on inductor 31, for great reduction of the inductance thereof when arms 103 and 107 are in contact with elements 110 and 108. Elements 109 and 111 are connected to taps nearer the ends of inductor 31, for lesser reduction of the inductance thereof when contacted by arms 107 and 103, respectively. When the arms are midway between the stationary contact elements, the inductor 31 has maximum inductance, as no turns of the inductor are shorted out in this condition.

The stanchions of switches 42 and 46 are connected through lugs 121 and 122 and conductors 123 and 124 to taps equally displaced from the ends of inductor 36; and the fixed contact elements 125 and 126 of these switches are connected to contact elements 63 and 64 and to the ends of inductor 36.

Returning now to Fig. 5, the effect of all of the switches may be described in terms of the changes of the circuit conditions as the knob 79 is rotated from the position in which it is illustrated. With clockwise rotation, the effective tank circuit capacitance is gradually reduced from the maximum with all sections in circuit, while the full inductance of inductor 36 is empoyed. The tank circuit may be arranged to tune through a frequency range including the band from 3.5 to 4 megacycles per second, represented by the arc 131, with the full inductor 36 effective. At 87, switches 42 and 46 close, shunting out equal end portions of inductor 36, abruptly reducing the inductance afforded thereby in the tank circuit. This reduction of the effective inductance of inductor 36 may be to approximately one-half its maximum inductance, for tuning through a frequency band approximately one octave higher in frequency—e. g., for tuning through the frequency range from 7.0 to 7.3 megacycles per second, represented by arc 133.

At 83, switches 41 and 45 shift the circuit connections over to exclude inductor 36 and the large split-stator capacitor 66, 67 from the circuit, leaving only inductor 31 connected to the stator terminals of capacitor sections 58 and 59 and the external circuit terminal lugs 55 and 56. In the dial sector between 83 and 88, switches 43 and 47 are conditioned as illustrated in Fig. 6–A, so that the effective inductance of inductor 31 is reduced to approximately one-half its maximum inductance. In this sector, the tank circuit is employed for tuning through the highest frequency band for which it is designed, e. g. the band of frequencies between 28.0 and 30.0 megacycles per second, as represented by arc 135.

As the pointer 85 passes position 88, switches 43 and 47 shift to conditions as illustrated in Fig. 6–B. Lesser portions of inductor 31 are now shorted, and the effective inductance in the circuit is approximately three-fourths maximum inductance of the unit 31. Within the sector between 88 and 89, the tank circuit is tuned through the frequency band between 21.0 and 21.5 megacycles per second, as represented by arc 137.

At 89, switches 43 and 47 are again shifted, this time to assume neutral arm positions as indicated in Fig. 6–C, so that inductor 31 affords its maximum inductance in the circuit. Between points 89 and 81, the tank is tuned through the frequency band between 14.0 and 14.4 megacycles per second, as represented at 139.

The tank unit thus far described may be arranged for unlimited rotation.

Figure 7:
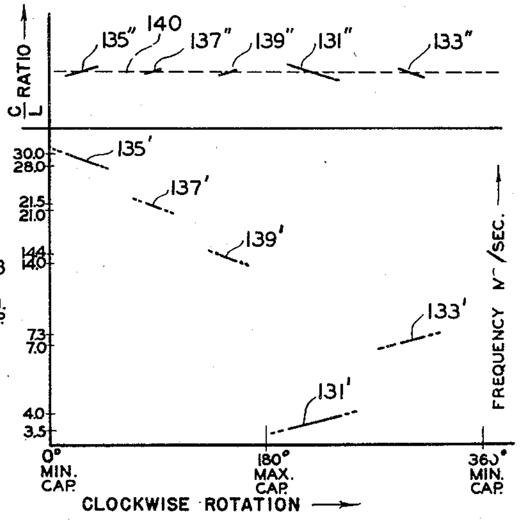
Fig. 7 is a graph showing the resonant frequency variations and capacitance-inductance ratio of the tank as functions of the dial setting.

Fig. 7 graphically shows the relations of the five tuning ranges in the tank system of Figs. 1–6, and also represents the facility for retention of the capacitance/inductance ratio substantially uniform throughout all of the tuning ranges. Ranges 131′, 133′, 139′, and 135′ are spaced apart in frequency approximately according to successive one-octave steps; hence for substantially uniform ratios of the effective capacitance and inductance, the corresponding reactance values must change in approximately 2:1 steps. This actually is accomplished in the inductance part of the tank arrangement, the effective inductance being cut approximately in half with transfer of the knob from the 3.5 megacycle range 131, 131′ to the 7.0 megacycle range 133, 133′, and inductor 31 providing a further reduction by one-half as compared to the reduced-inductance value of inductor 36 when the tank circuit is tuned through the 14.0-megacycle range 139, 139′, and a yet further reduction by one-half for tuning through the 28.0-megacycle range 135, 135′. The 21-megacycle band 137, 137′ is intermediately located in this highest octave frequency step, and an intermediate inductance reduction is accordingly provided therefor, as set forth above.

With these reductions of inductance in inverse ratio to the steps by which the frequency bands are spaced in the spectrum, it follows that the capacitance/inductance ratio will be uniform for certain spot frequencies, one in each of the five tuning ranges. However, since tuning within a selected band is accomplished by capacitance variation alone, the ratio of capacitance and inductance varies slightly in tuning through a band, as indicated by the slight inclination of each of the graph portions 135″, 137″, 139″, 131″ and 133″ in the upper part of the graph of Fig. 7. Note that these inclined graph portions show slight departures of the capacitance-inductance ratio from the nominal ideal ratio indicated by the horizontal dotted line 140, but such departures, amounting to only a few percent, are practically negligible insofar as concerns the effect upon the operation of the radio equipment including the tank system.

An important advantage provided by the reliance upon capacitance variations alone for tuning through a selected band becomes apparent when it is realized that the angular adjustment range of the knob 79 for each band is approximately twice as great as it would be with simultaneous continuous variation of inductance and capacitance throughout the frequency band. This greater angular "spread" of the bands greatly facilitates the accurate adjustment for precise tuning to resonance at the operating frequency.

A further important advantage provided by the step variations of inductance in preference to continuously variable inductance devices of angular adjustment ranges of the order of 180° maximum-to-minimum rotation angle resides in the retention of very high Q of the inductors under all operating conditions—the Q of the inductance in the present invention, and hence the efficiency of the tank, being commensurate with that ordinarily obtainable with a simple combination of a capacitor and an ordinary fixed inductor. Thus, maximum radio-frequency output power is obtainable from a transmitter employing the present invention and, furthermore, the mechanical difficulties which accompany radio-frequency heating of coils of moderate or low Q are entirely avoided.

The tank arrangement as thus far described is a balanced tank system suitable for connection between the grids or the anodes of a push-pull radio-frequency oscillator or amplifier, and for provision of a mid-point at zero radio-frequency potential. Such a balanced tank arrangement is also desirable for use in the anode circuit of a single-tube or other unbalanced radio-frequency oscillator or amplifier where a split circuit is required, as either for a grid feed-back circuit for sustaining oscillations, e. g. a Hartley or a Colpitts oscillator arrangement, or for a neutralizing bridge circuit for preventing self-oscillation within a stage intended to operate only as an amplifier.

Fig. 8 schematically illustrates the connection of the balanced tank circuit between the anodes 141 and 142 of a push-pull radio-frequency amplifier 143. The anodes are connected to terminal lugs 55 and 56, and the positive terminal of a high-voltage power supply 150 is coupled through a current-carrying radio-frequency choke 146 and a terminal lug 147 to the mid-taps of inductors 31 and 36. A resistor 148 such as a low-wattage, high-resistance carbon unit is connected between terminal lug 147 and a lug 149 attached to the metal framework of the capacitor system, as to the front plate 11. A high-voltage radio-frequency by-pass capacitor 151 is provided between the cathode circuit of the radio-frequency amplifier 143 and either terminal 147 or 149, depending upon whether the mid-taps of the inductors or the mid-taps (rotors) of the capacitors are to be relied upon for establishing the radio-frequency grounding point of the tank unit.

Neutralizing capacitors 153 and 155 are cross-connected between anodes and opposite control grids. If a single tube and neutralizing capacitor is to be used with the balanced tank arrangement, the connections are arranged in the manner of tube 156 and neutralizing capacitor 155, tube 158 and capacitor 153 being omitted.

As has been pointed out heretofore, inductor 36 only is effective when pointer 85 is within the upper semi-circular zone of the dial in Fig. 5, and inductor 31 only is effective when the pointer is in the lower half of the dial range. Hence, it is necessary that an arrangement be provided for coupling the active inductor to a load. Preferably, moreover, the coupling arrangement should be of such design as to permit convenient and smooth variation of the coupling of the load, from the front of the tank unit and without the requirement of complex control elements. For this purpose, a movable link coil 161 is arranged for movement between a position of close coupling to inductor 31 and a position of close coupling to inductor 36, the link coil 161 being shown in the extreme position of close coupling to inductor 36 in Figs. 1 and 2, and being schematically indicated in the position of maximum coupling to inductor 31 in the schematic diagram of Fig. 8.

Link coil 161 is supported on an arm 163 which in turn is fastened on a shaft 165 borne in journals 167 and 169, and provided with an adjustment knob 171. When inductor 36 is effective, the knob 171 may be turned clockwise to increase the coupling to the load, or counter-clockwise to reduce the coupling to the load. When inductor 31 is effective, on the other hand, the knob is turned counter-clockwise to increase the loading, or clockwise to reduce the loading from a closely coupled condition. Thus, the position of coil 161 for maximum coupling to inductor 36 for upward positions of pointer 85 corresponds to the position for minimum coupling to inductor 31 for downward positions of the pointer; and inversely, the position of the link coil 161 for maximum coupling to inductor 31 for downward pointer positions corresponds to that for minimum coupling to inductor 36 for upward positions of the pointer 85.

Whereas the link coil 161 is indicated in Fig. 8 as coupled to a power-taking load 173, and has been described in the preceding paragraphs as adjustable for proper loading of the amplifier 143, this link coil is equally suitable for feeding energy to the tank unit from a driving stage such as an oscillator or low-power radio-frequency amplifier when the tank unit is employed in the grid circuit of a radio-frequency amplifier.

The arrangement of the balanced tank of Figs. 1, 2 and 4 with a lower-capacitance split-stator capacitor on one shaft and a high-capacitance split-stator capacitor on a parallel shaft between front plate 11 and rear plate 12 is particularly well suited for compact design of the tank unit, and provides for very short connecting wires, particularly in the circuit portions connected to the high-frequency inductor 31. Moreover, this design is well suited for use with the link coil 161 arranged to be swung between the middle of inductor 31 and the middle of inductor 36. For achieving great compactness with this parallel-rotor dual-split-stator arrangement, the rotor plates are made to interleave when turned outward toward or through the minimum-capacitance positions, as illustrated in Figs. 1 and 2. For this purpose, the rotor plates 181 on shaft 14, spaced at intervals equal to those of the rotor plates on shaft 15, are positioned longitudinally of shaft 14 to pass between the rotor plates 183 on the coextensive part of shaft 15. Accordingly, as is apparent in Fig. 2, the cross-sectional dimensions of the capacitor assembly are only approximately fifty percent greater than the corresponding dimensions required with an ordinary single rotor capacitor system of similar rotor and stator plate sizes. With these features, the volume of space required by the tank unit of Figs. 1, 2 and 4 is only very slightly greater than that required for a balanced tank system of comparable maximum capacitance and voltage capacity, with an ordinary split-stator capacitor and a single inductor.

Figure 9:
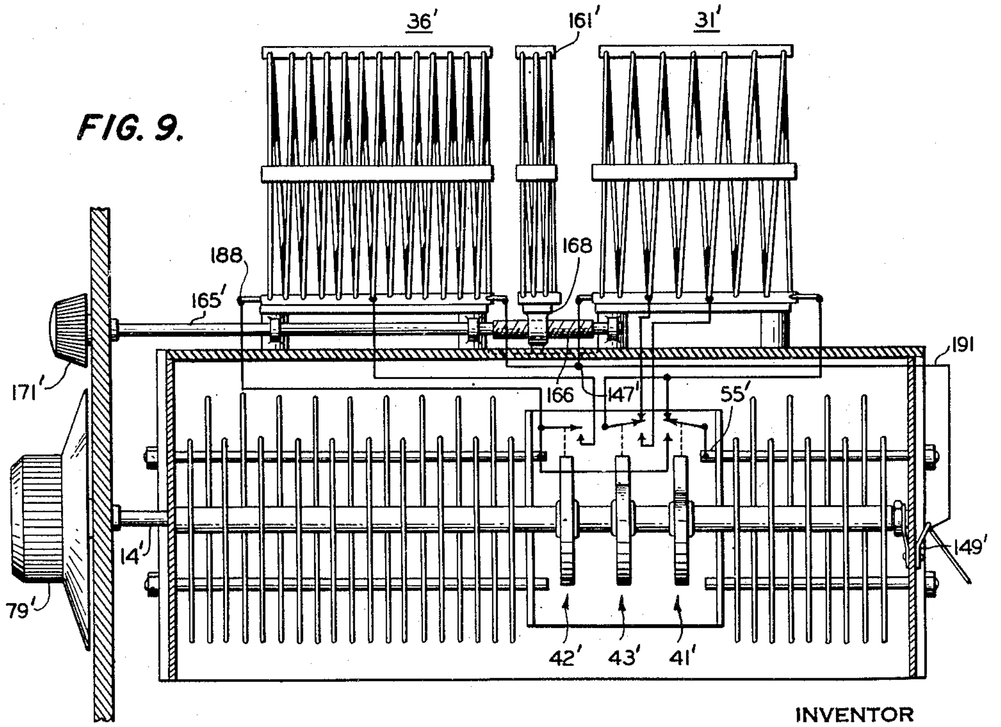
Fig. 9 is a side elevation of an asymmetrical tank arrangement including features of the invention.

For certain applications, e. g. for the anode tank circuit of a single screen-grid radio-frequency amplifier free from neutralization requirements, an unbalanced type of tank is appropriate. Such a version for incorporating the features of point switching of inductance and a link coupling coil shiftable between the position of maximum coupling to a first inductor and the position of maximum coupling to a second inductor (minimum coupling to the first inductor) is illustrated in Fig. 9. A single rotor shaft 14′ is used here, with a large capacitor section (not split-stator) on the forward half and with a set of cam switches and a smaller capacitor section on the rearmost half of the shaft. The cam switches are designated 41′, 42′ and 43′, to emphasize their close correspondence to one of the two similar sets of cam switches in the balanced tank arrangement of Fig. 1, and these switches are connected to the inductors 31′ and 36′ in the same way as the connections of switches 41, 42 and 43 to the forward coils 32 and 37 of the balanced inductors 31 and 36, respectively, the single stator of the forward capacitor being permanently connected to the end 188 of inductor 36′, and acting in addition to the capacitance of the rearmost capacitor section when the low-frequency inductor 36′ is connected in circuit by switch 41′ throughout substantially 180° of the range of rotation of the dial knob 79′.

The link coil 161′ of the unbalanced or asymmetrical tank of Fig. 9 is arranged for longitudinal movement from a position closely adjacent the end of inductor 36′ to a position closely adjacent the end of inductor 31′, the former position being that for closest coupling to inductor 36′ and loosest coupling to inductor 31′ and the latter position being that for closest coupling to inductor 31′ and loosest coupling to inductor 36′. Thus, although the axes of inductors 36′ and 31′ and coil 161′ remain aligned at all times, this tank arrangement like that of Figs. 1 and 2 provides opposite movements of the link coil for similar changes of coupling to the two separate inductors. The longitudinal adjustment of coil 161′ is accomplished through the rotation of link coupling control knob 171′ and shaft 165′, the latter bearing a long-pitch helical screw portion 166 cooperating with mating threads in the follower arrangement 168 at the bottom of link coil 161′.

The external connection terminals of the asymmetrical tank arrangement of Fig. 9 are assigned designations 55′, 147′ and 149′ to emphasize their correspondence to all except terminal 56 of the external connection terminals of the balanced tank arrangement. Terminal 55′ may be connected to the anode of a screen-grid radio-frequency amplifier, while terminals 147′ and 149′ are connected together by conductor 191 and may be connected to the positive terminal of the anode supply source.

The tuning ranges of the tank circuit of Fig.

9 may readily be made identical with those illustrated in Fig. 5 and described in connection with the balanced tank arrangement of Figs. 1, 2 and 4. Similar inductance changes are made to take place at corresponding points, and the substantially uniform capacitance/inductance ratio is maintained in the same way as with the balanced tank.

The tuning ranges specified in Fig. 5 are the most popular frequency ranges of those assigned to amateur radio communication by the Federal Communications Commission, and have been taken for purposes of illustration. It will be apparent that the present invention is readily suited for accommodating any other desired group of frequency bands, e. g. for the several short-wave bands assigned for international long-distance broadcasting, and that all of the principles of the specific tank arrangements described above are fully applicable for such groups of bands. Moreover, it will be readily apparent that the low-frequency end of the tuning range starting with counter-clockwise rotation of pointer 85 from position 81 may be made to overlap and further extend the tuning range for a continuous broad tuning band from the highest frequency reached with clockwise rotation of the pointer 85 up to point 83. These are merely a few illustrations to show the flexibility of the present invention for adaptation to varied circuit requirements.

An important feature of the tank circuit apparatus of the present invention, made clearly apparent in Fig. 5, is the freedom from ambiguity of the dial settings in relation to the operating frequencies, the wide spread of the angular tuning range for each frequency band, and the full utilization of the total 360° range of rotation of the rotor shafts—these features being simultaneously achieved through the switchover effected at points 81 and 83 between the generally low frequencies and the generally high frequencies. Along with these features, the tank circuit apparatus is at all times a single-frequency responsive unit, giving selective action fully equivalent to that of an ordinary tank circuit with a single capacitor connected to a single inductor, and thus it is fully useable and reliable for oscillators as well as amplifiers requiring maximum harmonic suppression.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Tank circuit apparatus comprising a variable capacitance system, first and second inductors, and switching means operatively coupled to said variable capacitance system to be actuated at selective capacitance adjustments thereof, said variable capacitance system comprising first and second variable capacitors ganged together including rotor means rotatable through two successive 180° range portions each between a position of minimum capacitances of both capacitors and a position of maximum capacitances of both capacitors, the first capacitor including means for permanent connection to an external circuit, means connecting the second capacitor to said second one of said inductors, conductor means electrically interconnecting said switching means with said capacitors and said inductors said switching means including means for maintaining said first capacitor connected to said first inductor throughout one of said 180° range portions and for transferring the connection of said first capacitor to shunt with said second capacitor and said second inductor through the other of said 180° portions.

2. Tank circuit apparatus as defined in claim 1, wherein said switching means further includes means for altering the inductance of the inductor coupled through said switch to said first capacitor at a selected point in the rotation of said rotor in one of said 180° range portions.

3. Tank circuit apparatus comprising a first variable capacitor at a first maximum capacitance and a second variable capacitor of higher maximum capacitance having a common rotor system rotatable through two successive 180° angular ranges between minimum capacitance and maximum capacitance positions, a first inductor and a higher-capacitance second inductor, and switching means coupled to said rotor system for mechanical operation therewith for connecting said first capacitor to said first inductor throughout one of said 180° ranges and for connecting said second inductor and said second capacitor in shunt with said first capacitor throughout the other of said 180° ranges.

4. Tank circuit apparatus as defined in claim 3, wherein said switching means comprises at least one cam switch having a cam coupled to said rotor for rotation therewith and a movable switch element controlled thereby and at least one fixed switch element cooperating therewith.

5. Tank circuit apparatus as defined in claim 3 wherein said switching means includes means for abruptly changing the inductance of at least one of said inductors at a selected point intermediate within the one of said 180° ranges throughout which it is connected through said switching means to said first variable capacitor.

6. Tank circuit apparatus comprising a variable capacitor, a plurality of inductors, means electrically connected to said capacitor and said inductors for switching a selected one of said inductors into circuit with said capacitor at a predetermined point in the range of adjustment thereof and for switching a further one of said inductors into circuit with said capacitor at a further predetermined point in the range of adjustment thereof, and a movable coil for coupling an external circuit to whichever one of said inductors is selected, said movable coil being smoothly adjustable between a position of proximity with one of said inductors and a position of proximity with another of said inductors, whereby a common range of movement thereof permits wide-range variation of the inductive coupling to a selected one of said plurality of inductors.

7. Tank circuit apparatus comprising a variable capacitor unit having a plurality of variable capacitance sections, a first inductor electrically coupled to at least one of said capacitance sections, a second inductor, means for electrically coupling said second inductor to a second one of said capacitance sections, common means for varying the capacitances of said first and second capacitance sections, a link coupling coil for electromagnetically coupling to an external circuit, and means for adjusting said link coupling coil through a range of positions between a position of close proximity to said first inductor and a position of close proximity to said second inductor.

8. Tank circuit apparatus comprising a variable capacitor system, a first inductor and a second inductor, means electrically intercoupling said capacitor system and said first and second inductors for providing resonant response to a first radio frequency in said first inductor and at least part of said capacitor system and for providing resonant response to a second radio frequency in said second inductor and at least part of said capacitor system, a link coupling coil, and means providing relative movement between said link coupling coil and said first and second inductors for simultaneously varying the degrees of inductive coupling of said link coil with said first inductor and said second inductor.

9. Tank circuit apparatus comprising, in combination, a smoothly variable capacitance system and a step-variable inductor system and switching means and a link coupling system; said smoothly variable capacitance system comprising a first variable capacitor and a second variable capacitor having greater maximum capacitance than said first variable capacitor, said first and second variable capacitors having mechanically intercoupled rotors; said step variable inductor system comprising a plurality of inductors having parallel axes; said switching means including rotor portions mechanically coupled to said rotors to turn therewith and defining multiple circuit transfer points at selected angular positions of said rotors, said switching means being electrically connected to said capacitors and to said inductors for electrically interconnecting selected inductance and capacitance portions in selected parts of the angular range of adjustment of said rotors; and said link coupling system including a coil shiftable through a range of movement affording simultaneous variation of its closeness of inductive coupling to said first inductor and its closeness of inductive coupling to said second inductor.

10. Tank circuit apparatus as defined in claim 9, wherein said first variable capacitor is a split-stator capacitor having equal variable capacitor parts and said second variable capacitor is a split-stator capacitor having equal variable capacitor parts, said second split-stator capacitor being positioned beside said first split-stator capacitor and having its axis of rotation parallel thereto, said inductors each being divided into two equal spaced coil portions, and being positioned parallel to the axes of rotation of the rotors of said capacitors, and said link coupling system coil being pivoted about an axis displaced from its own axis and from the axes of said inductors and parallel to the axes of said inductors and said coil being shiftable through an arcuate path passing between the equally spaced portions of each of said inductors.

11. Tank circuit apparatus as defined in claim 9, wherein said first variable capacitor and said second variable capacitor are positioned side by side, the rotor of said first variable capacitor being rotatable about a first axis and the rotor of said second variable capacitor being rotatable about a second axis parallel thereto, said first capacitor having at least one stator section adjacent said first axis on the side opposite said second axis, and said second capacitor having at least one stator section adjacent said second axis on the side opposite saide first axis, said first capacitor having mutually interleaving rotor and stator plates perpendicular to said first axis and said second capacitor having mutually interleaving rotor and stator plates perpendicular to said second axis, said first and second rotor axes being separated by a dimension less than the sum of the diameters of the respective rotor plates of said first and second rotors, and the respective rotor plates being located in staggered positions longitudinally of said axes whereby interleaving of the rotor plates is permitted as the rotors are turned to the minimum capacitance positions and compactness of the tank circuit apparatus is thereby achieved.

12. Tank circuit apparatus as defined in claim 9, wherein said first and second capacitors have their rotors aligned along a common axis and rigidly interconnected, said plurality of inductors comprises first and second inductors spaced apart and aligned parallel with said common axis, and said link coupling system comprises a coil movable longitudinally along said axis between a position of close adjacency to said first inductor and a position of close adjacency to said second inductor.

13. Tank circuit apparatus comprising, a first variable capacitor having a first predetermined maximum capacitance value, a second variable capacitor having a second predetermined maximum capacitance value appreciably greater than said first maximum capacitance value, said first and second variable capacitors having ganged rotors, a first inductor of a first inductance value, a second inductor having appreciably higher inductance than said first inductance value, a pair of tank terminals, and switching means coupled to said ganged rotors to be operated by rotation thereof, said switching means including means electrically interconnecting said first capacitor and said first inductor as a shunt resonant circuit between said tank terminals during rotation of said rotors through a first angular range of tuning of said rotors and for electrically interconnecting said second capacitor and said second inductor between said tank terminals during rotation of said rotors through a second angular range of tuning of said rotors.

14. Tank circuit apparatus as defined in claim 13, further including a link coupling coil movably supported for movement from a position of maximum coupling to said first inductor and minimum coupling to said second inductor to a position of maximum coupling to said second inductor and minimum coupling to said first inductor.

15. Tank circuit apparatus as defined in claim 14, wherein said first and second inductors are positioned with their axes parallel, and said link coupling coil is pivoted about an axis parallel to both said inductor axes and displaced therefrom.

16. Tank circuit apparatus as defined in claim 14, wherein said first and second inductors are positioned with their axes aligned, and said link coupling coil is supported therebetween for translation from a position adjacent the end of said first inductor to a position adjacent the end of said second inductor.

17. Tank circuit apparatus as defined in claim 13, wherein said switching means comprises means for changing the inductance of at least one of said inductors at a predetermined angular position of the rotor of the capacitor interconnected therewith.

18. Tank circuit apparatus as defined in claim 13, wherein said first capacitor is included in shunt connection with said second capacitor and said second inductor between said tank terminals during rotation of said rotors through said second angular range.

19. Tank circuit apparatus comprising a first variable capacitor having a first predetermined maximum capacitance value, a second variable capacitor having a second predetermined maximum capacitance value appreciably greater than said first maximum capacitance value, said first and second variable capacitors having ganged rotors, a first inductor of a first inductance value, a second inductor having appreciably higher inductance than said first inductance value, a pair of tank terminals, switching means coupled to said ganged rotors to be operated by rotation thereof, said switching means including means electrically interconnecting said first capacitor and said first inductor as a shunt resonant circuit between said tank terminals during rotation of said rotors through a first angular range of tuning of said rotors and for electrically interconnecting said second capacitor and said second inductor between said tank terminals during rotation of said rotors through a second angular range of tuning of said rotors, said first and second inductors each comprising two coil portions spaced apart along a common axis, the axis of said first inductor being spaced from the axis of said second inductor and being parallel thereto, and a link coupling coil pivoted about an axis parallel to the axes of said first and second inductors and spaced therefrom, said link coupling coil being angularly movable through a range from a position between the coil portions of said first inductor to a position between the coil portions of said second inductor.

20. Tank circuit apparatus as defined in claim 19, wherein each of said capacitors comprises a split-stator capacitor, and the coil portions of each of said inductors are symmetrical.

21. Tank circuit apparatus as defined in claim 19, wherein said switching means comprises means interconnecting said first and second capacitors and said second inductor in shunt during rotation of said rotors through at least part of said second angular range of tuning, said switching means including means for changing the effective circuit inductance of said first inductor at a predetermined position in said first angular range of tuning and means for changing the effective circuit inductance of said second inductor at a predetermined position in said second angular range of tuning.

22. Tank circuit apparatus as defined in claim 19, wherein said first and second capacitor rotors each comprise a plurality of plates on a shaft, the rotor shafts being spaced apart and the plates being spaced to be mutually interleaved as the capacitors are adjusted toward minimum capacitance.

23. Tank circuit apparatus as defined in claim 19, wherein said switching means comprises a plurality of cams positively coupled to said rotors for rotation therewith, and switches actuated by the respective cams and connected to said capacitors and said inductors for accomplishing changes in the resonant circuit between said tank terminals at predetermined angular positions of said rotors.

24. Tank circuit apparatus comprising a first variable capacitor having a first predetermined maximum capacitance value, a second variable capacitor having a second predetermined maximum capacitance value appreciably greater than said first maximum capacitance value, said first and second variable capacitors having ganged rotors, a first inductor of a first inductance value, a second inductor having appreciably higher inductance than said first inductance value, means electrically interconnecting said first capacitor and said first inductor in a shunt resonant circuit, means electrically interconnecting said second capacitor and said second inductor in a second shunt resonant circuit, and a link coupling coil movably supported for movement through a range of movement from a position of maximum inductive coupling to said first inductor and minimum inductive coupling to said second inductor to a position of maximum inductive coupling to said second inductor and minimum inductive coupling to said first inductor.

25. Tank circuit apparatus as defined in claim 24, wherein said first and second capacitors have parallel rotor shafts, and each of said rotors comprises a series of rotor plates, the rotor plates of said second capacitor interleaving with the rotor plates of said first capacitor as said capacitors are adjusted toward minimum capacitance.

THOMAS M. FERRILL, Jr.

REFERENCES CITED

The following references are of record in the file of this patent:

UNITED STATES PATENTS

| Number | Name | Date |
|---|---|---|
| 1,559,802 | Stevenson | Nov. 3, 1925 |
| 1,727,641 | Grebe | Sept. 10, 1929 |
| 1,761,211 | Jones et al. | June 3, 1930 |
| 1,986,890 | Gage | Jan. 8, 1935 |

FOREIGN PATENTS

| Number | Country | Date |
|---|---|---|
| 268,848 | Great Britain | Apr. 1, 1927 |
| 497,830 | Great Britain | Dec. 20, 1938 |
| 543,639 | Great Britain | Mar. 6, 1942 |